(12) United States Patent
Kashiwagi

(10) Patent No.: US 8,888,303 B2
(45) Date of Patent: Nov. 18, 2014

(54) OPTICAL SHEET CONTROLLING EXTERNAL LIGHT, DISPLAY DEVICE AND METHOD FOR PRODUCING OPTICAL SHEET

(75) Inventor: Tsuyoshi Kashiwagi, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 911 days.

(21) Appl. No.: 12/677,331

(22) PCT Filed: Sep. 10, 2008

(86) PCT No.: PCT/JP2008/066311
§ 371 (c)(1),
(2), (4) Date: Mar. 10, 2010

(87) PCT Pub. No.: WO2009/034992
PCT Pub. Date: Mar. 19, 2009

(65) Prior Publication Data
US 2010/0328777 A1    Dec. 30, 2010

(30) Foreign Application Priority Data

Sep. 12, 2007    (JP) .................................. 2007-237142

(51) Int. Cl.
| | | |
|---|---|---|
| G02B 27/00 | (2006.01) | |
| G02B 5/00 | (2006.01) | |
| G02B 5/04 | (2006.01) | |
| H01J 11/10 | (2012.01) | |
| H01J 11/44 | (2012.01) | |

(52) U.S. Cl.
CPC ............... *G02B 5/003* (2013.01); *G02B 5/045* (2013.01); *H01J 11/10* (2013.01); *H01J 11/44* (2013.01); *H01J 2211/444* (2013.01)
USPC ............................ 359/601; 359/614; 362/290

(58) Field of Classification Search
None
See application file for complete search history.

(56) References Cited

U.S. PATENT DOCUMENTS

| | | | |
|---|---|---|---|
| 6,398,370 B1* | 6/2002 | Chiu et al. ..................... 359/613 |
| 2006/0145578 A1* | 7/2006 | Park et al. ...................... 313/112 |
| 2008/0151555 A1 | 6/2008 | Jo et al. | |

FOREIGN PATENT DOCUMENTS

| | | |
|---|---|---|
| JP | 2006-145611 A | 6/2006 |
| JP | 2006-178092 A | 7/2006 |
| JP | 2006-189867 A | 7/2006 |
| JP | 2006-301588 A | 11/2006 |
| JP | 2007-514202 A | 5/2007 |
| JP | 2008-158530 A | 7/2008 |

OTHER PUBLICATIONS

International Search Report: PCT/JP2008/066311.

\* cited by examiner

*Primary Examiner* — Arnel C Lavarias
(74) *Attorney, Agent, or Firm* — Ladas & Parry LLP

(57) ABSTRACT

An optical sheet, which can suitably absorb external light over a wide range and can improve a contrast, a display device, and a method for producing an optical sheet. The optical sheet is disposed on an observer side relative to an image light source and includes: a plurality of layers that control light emitted from the image light source to emit the light on the observer side, wherein at least one of the plurality of layers is an optical functional sheet layer which includes prisms being arranged in parallel along the surface of the optical sheet whereby light can be transmitted and wedge portions are arranged in parallel between the prisms whereby light can be absorbed. At least one of the plurality of layers other than the optical functional sheet layer is a light-absorbing layer.

4 Claims, 14 Drawing Sheets

OPTICAL SHEET CONTROLLING EXTERNAL LIGHT, DISPLAY DEVICE AND METHOD FOR PRODUCING OPTICAL SHEET

TECHNICAL FIELD

This invention relates to an optical sheet, which is disposed on an observer side relative to an image light source and can suitably control image light and external light, a display device, and a method for producing an optical sheet. More particularly, this invention relates to an optical sheet, which can block external light entering over a wide range to improve the contrast, a display device, and a method for producing an optical sheet.

BACKGROUND ART

In a display device such as a television using a plasma display panel (hereinafter, it may be referred to as "PDP".), an optical sheet is disposed on an observer side relative to the PDP. The optical sheet serves to provide the observer with a higher quality image. Therefore, the optical sheet includes prisms which are arranged in parallel along the sheet surface of the optical sheet and transmit therethrough image light from the PDP. Further, the optical sheet includes wedge portions provided between the prisms and suitably blocking or reflecting image light and external light to improve a contrast or to control ghost (see Patent Document 1.).

Patent Document 1: Japanese Patent Application Laid-Open No. 2006-189867

DISCLOSURE OF THE INVENTION

Problems To Be Solved By the Invention

In the optical sheet disclosed in Patent Document 1, external light is absorbed only by the wedge portions disposed between the prisms. Thus, the optical sheet can absorb well external light (for example, light from ceiling lighting) entering at a large angle with respect to the normal line of a screen. However, the optical sheet is less likely to absorb external light entering at a small angle with respect to the normal line of the screen. Therefore, the contrast sometimes cannot be satisfactorily obtained as a whole.

Thus, in view of the above problem, an object of the present invention is to provide an optical sheet, which can suitably absorb external light over a wide range and can improve the contrast, the display device, and a method for producing an optical sheet.

Means For Solving the Problem

Hereinafter, the present invention will be described. For ease of understanding the invention, the reference numerals of the attached drawings are enclosed in parenthesis, but by no means limit the invention to the illustrated embodiments.

The first aspect of the present invention provides an optical sheet (10, 20, 30) disposed on an observer side relative to an image light source including: a plurality of layers that control light emitted from the image light source to emit the light on the observer side, wherein at least one of the plurality of layers is an optical functional sheet layer (11, 21, 31), which includes prisms (12, 22, 32) being arranged in parallel along a surface of the optical sheet whereby light can be transmitted and wedge portions (13, 23, 33) being arranged in parallel between the prisms whereby light can be absorbed; and at least one of the plurality of layers other than the optical functional sheet layer is a light-absorbing layer (17, 27, 37) capable of absorbing light, thereby the above problem is solved.

The second aspect of the invention is characterized in that the light-absorbing layer (17, 27, 37) of the optical sheet (10, 20, 30) according to the first aspect of the invention absorbs light having a predetermined wavelength.

The third aspect of the invention is characterized in that the wedge portion (13, 23, 33) and the light-absorbing layer (17, 27, 37) of the optical sheet (10, 20, 30) according to the first or second aspect of the invention comprise the same material.

The fourth aspect of the invention is characterized in that the light-absorbing layer (17, 27, 37) of the optical sheet (10, 20, 30) according to any one of the first to third aspects of the invention is formed integrally with the wedge portion (13, 23, 33).

The fifth aspect of the invention is characterized in that the wedge portion (13, 23, 33) of the optical sheet (10, 20, 30) according to any one of the first to fourth aspects of the invention is configured to show a light absorption performance having a transmittance of 40-70% when measuring the transmittance of a 6 μm thick optical sheet made only of materials for forming the wedge portion.

The "transmittance" means the ratio of the brightness before and after the target sheet is disposed and it has a value of up to 100%.

The sixth aspect of the invention is characterized in that in a cross section in a sheet thickness direction of the optical sheet (10, 20, 30) according to any one of the first to fifth aspect of the invention, the prism (12, 22, 23) of the optical functional sheet layer (11, 21, 31) has a trapezoidal shape whose short upper base is located at one sheet surface side and long lower base is located at the other sheet surface side, and the wedge portion (13, 23, 33) has a triangular shape whose bottom is located at the one sheet surface side.

The seventh aspect of the invention is characterized in that in a cross section in a sheet thickness direction of the optical sheet (10, 20, 30) according to any one of the first to fifth aspects of the invention, the prism (12, 22, 32) of the optical functional sheet layer (11, 21, 31) has a trapezoidal shape whose short upper base is located at one sheet surface side and long lower base is located at the other sheet surface side, and the wedge portion (13, 23, 33) has a trapezoidal shape whose long lower base is located at the one sheet surface side and short upper base is located at the other sheet surface side.

The eighth aspect of the invention is characterized in that the oblique line of the trapezoid provided between the upper base and the lower base of the prism (12, 22, 32) of the optical sheet (10, 20, 30) according to the sixth or seventh aspects of the invention has an angle of more than 0° and not more than 10° with respect to the normal line of the sheet surface.

The ninth aspect of the invention is characterized in that the oblique line of the optical sheet (10, 20, 30) according to eighth aspect of the invention includes a polygonal line or a curved line.

When the oblique line is curved, the angle formed by the curved line and the normal line of the sheet surface is obtained as follows. The curved line is divided equally into 10 lines in the sheet thickness direction, and the end points of the obtained curved lines are connected to obtain straight lines. An angle formed by each of the straight lines and the normal line of the sheet surface is more than 0° and not more than 10°.

The 10th aspect of the invention is characterized in that the wedge portion (13, 23) of the optical sheet (10, 20) according to any one of the first to ninth aspects of the invention contains light-absorbing particles with an average particle diameter of not less than 1 μm.

With regard to "the average particle diameter is 1 μm" in the phrase "an average particle diameter of not less than 1 μm", a target particle has a diameter of not less than 0.5 μm and less than 1.5 μm when measuring the particle size using a weight distribution method, and a standard deviation is not less than 0.3 in particle size distribution.

The 11th aspect of the invention is characterized in that a material constituting the prism (12, 22, 32) of the optical sheet (10, 20, 30) according to the first to 10th aspects of the invention has a refractive index of Np, a material constituting the wedge portion (13, 23, 33) has a refractive index of Nb, the Np and Nb have a relation of Np≥Nb, and the Np and Nb have a value in a range of 1.49 to 1.56.

The 12th aspect of the invention is characterized in that the prism and the wedge portion of the optical functional sheet layer (11, 11") of the optical sheet (10") according to any one of the first to 11th aspects of the invention each have a predetermined cross section and extend in the longitudinal direction, and the two optical functional sheet layers are stacked such that the wedge portions of the two optical functional sheet layers are perpendicular to one another in the longitudinal directions.

The 13th aspect of the invention provides a display device (1) characterized by including the optical sheet (10, 20, 30) according to any one of the first to 12th aspects of the invention, whereby the above problem can be solved.

The 14th aspect of the invention provides a method for producing the optical sheet (10, 20, 30) according to any one of the first to 12th aspects of the invention. The process includes a step of forming the light-absorbing layer (17, 27, 37) by coating. The step includes a step of applying a light-absorbable resin to be cured by application of light and a step of irradiating light to the applied light-absorbable resin to cure the light-absorbable resin. The production process can solve the above problem.

Effect of the Invention

The present invention can provide: an optical sheet which can suitably absorb external light over a wide range and can improve a contrast; and a display device including the optical sheet.

The present invention also provides a production method, which includes applying a light-absorbable material to cure the material for producing an optical sheet, which makes it possible to easily form the light-absorbing layer.

EXPLANATION OF REFERENCE NUMERALS

Figure 1:
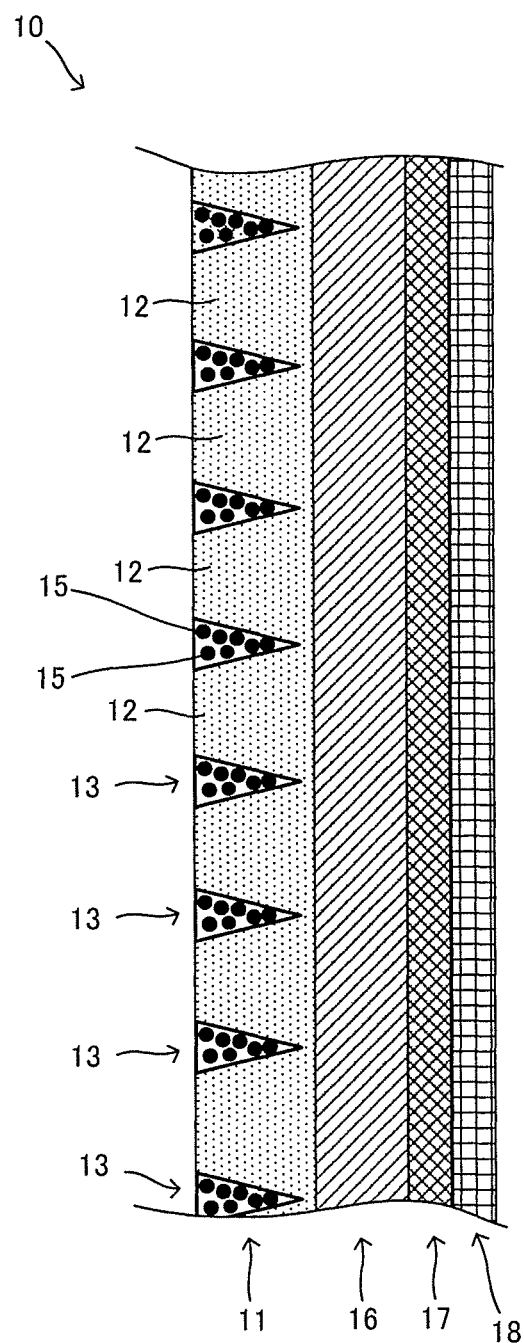
FIG. 1 is a cross-sectional view of an optical sheet according to a first embodiment of the present invention and shows a schematic layer structure of the optical sheet.

1 Plasma television (display device)
2 Plasma display panel (PDP)
10, 20, 30 Optical sheet
11, 21, 31 Optical functional sheet layer
12, 22, 32 Prism
13, 23, 33 Wedge portion
14, 24, 34 Binder (binder portion)
15, 25, 35 Light absorbing particle
16, 26, 36 PET film layer
17, 27, 37 Light absorbing layer
18, 28, 38 Adhesive layer Best Modes for Carrying Out the Invention The aforementioned functions and benefits of the present invention will be apparent from the following best modes for carrying out the invention.

Hereinafter, the present invention will be described based on embodiments shown in the drawings.

FIG. 1 shows a cross section of an optical sheet 10 of a first embodiment according to the present invention and shows a schematic layer structure of the optical sheet 10. In FIG. 1, some repeated reference numerals may be omitted for viewability (the same holds for the following drawings). The optical sheet 10 comprises: an optical functional sheet layer 11, a PET film layer 16 as a base material layer, a light-absorbing layer 17, and an adhesive layer 18. These layers extend on the far/near side of the drawing while maintaining the cross section shown in FIG. 1. Each layer will be described as below.

Figure 2:
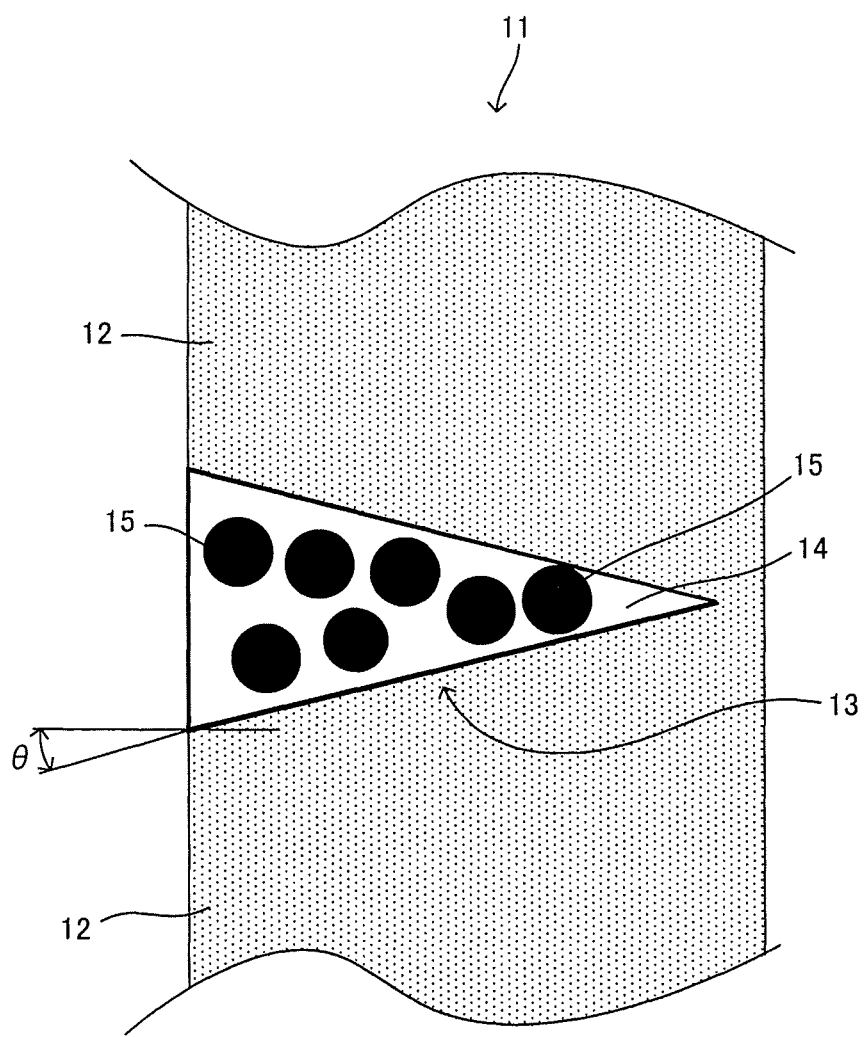
FIG. 2 is a partially enlarged view of the optical sheet of FIG. 1.

The optical functional sheet layer 11 comprises prisms 12 and wedge portions 13 arranged between the prisms 12. The cross section of the prism 12 perpendicular to the sheet surface of the optical sheet 10 has a substantially trapezoidal shape. FIG. 2 is a cross-sectional enlarged view focusing on the wedge portion 13 and the prisms 12 adjacent to the wedge portion 13. The optical functional sheet layer 11 will be described with reference to FIGS. 1 and 2 as well as other suitable drawings.

The prisms 12 are elements each of which has a substantially trapezoidal cross section whose upper base is located at one side of the optical functional sheet layer 11, and lower base is located at the other side. The prisms 12 are respectively formed of a light transmissive resin with a refractive index of Np. This is usually formed of, for example, epoxy acrylate characterized by being cured by, e.g., ionizing radiation, ultraviolet. The magnitude of Np is not specifically limited; however, in terms of availability of material, the magnitude is preferably 149 to 1.56. When image light transmits through the prisms 12, the image light is provided to an observer.

The wedge portions 13 are disposed between the prisms 12. Thus, each of the wedge portions 13 has a substantially triangular shape whose base corresponds to the upper base of the prism 12, and apex facing the base corresponds to the lower base of the prism 12. Each of the wedge portions 13 comprises a binder portion 14 filled with a material with a refractive index of Nb and light absorbing particles 15 mixed in the binder 14. External light enters or is absorbed by the wedge portions 13, whereby the contrast of an image can be improved.

A binder material filled in the binder portion 14 is formed of a material with a refractive index of Nb not more than the refractive index of Np of the prisms 12. The magnitude of Nb is not specifically limited; however, in terms of availability of the material, the magnitude is preferably 1.49 to 1.56. Although the difference between the refractive indexes Np and Nb is not particularly limited, the difference is preferably 0 to 0.06. Although a material used as the binder material is not particularly limited, for example, urethane acrylate characterized by being cured by, e.g., ionizing radiation and ultraviolet can be used.

According to the relation between the refractive index difference and the incident angle of image light, a part of the image light can be reflected on the interface without entering into the wedge portions (light absorbing parts) 13. Since the reflected light is provided to an observer, a bright image can be provided.

The average diameter of the light absorbing particles 15 is preferably not less than 1 μm in view of availability and handling. The light absorbing particles 15 are colored to a predetermined density by a pigment such as carbon or a dye in red, blue, or yellow. The light absorbing particles 15 may be colored by commercial colored resin fine particles. The refractive index Nr of the light absorbing particle 15 is not specifically limited.

Although the light absorption performance of the wedge portions 13 can be suitably adjusted according to the purposes, the wedge portions are preferably configured to show a light absorption performance having a transmittance of 40-70% when measuring the transmittance of a 6 μm thick optical sheet made only of materials for forming the wedge portion. Although the means for attaining the transmittance of 40 to 70% is not particularly limited, the content of light absorbing particles and the light absorption performance may be adjusted.

An angle θ of the oblique sides (two sides extending in the sheet thickness direction) of the wedge portions 13 with respect to the normal line of the sheet surface is not specifically limited. However, in terms of suitable reflection/absorption of both external light and image light, in many cases, the angle is preferably more than 0° and not more than 10°, and particularly more than 0° and not more than 6°.

Figure 3:
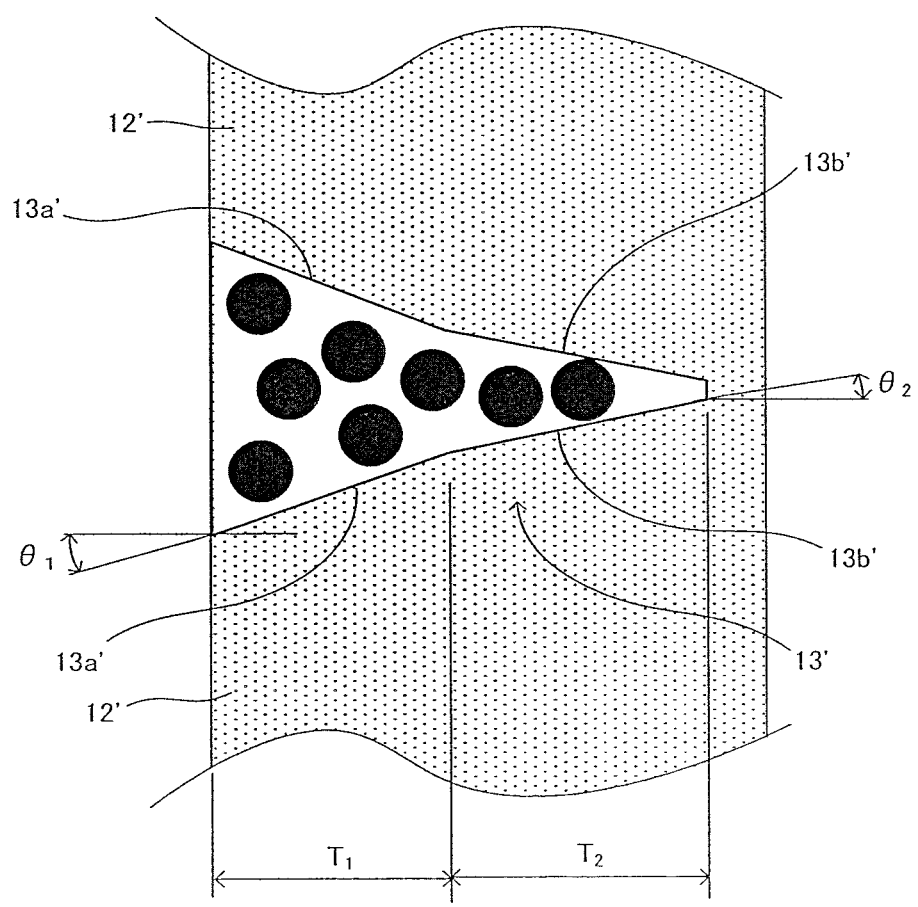
FIG. 3 is a partially enlarged view of an optical sheet according to a variation of the invention.

As the shape of the optical functional sheet layer 11, as shown in FIGS. 1 and 2, each of the prisms 12 has a substantially trapezoidal cross section, and each of the wedge portions 13 held between the prisms 12 has a triangular cross section. However, if light can be suitably controlled, those shapes are not specifically limited, and other appropriate shapes are suitably used. FIG. 3 shows a variation. FIG. 3 corresponds to FIG. 2 and is a view focusing on a wedge portion 13' and prisms 12' provided on the both sides of the wedge portion 13'. As seen in FIG. 3, the oblique lines in the cross section of the wedge portion 13' (the oblique lines of the prisms 12') are constituted of not one oblique line but two oblique lines 13a' and 13b'. Namely, the wedge portion 13' has polygonal line shaped oblique lines in the cross section. Specifically, with regard to the oblique lines 13a' provided on the upper base side of the prism 12' (the shorter base side) (the left side of FIG. 3), the oblique line 13a' has an angle $\theta_1$ with respect to the normal line of the sheet surface of the optical sheet. Meanwhile, with regard to the oblique lines 13b' provided on the lower base side of the prism 12' (the longer base side) (the right side of FIG. 3), the oblique line 13b' has an angle $\theta_2$ with respect to the normal line of the sheet surface of the optical sheet.

The angles $\theta_1$ and $\theta_2$ have a relation of $\theta_1 > \theta_2$, and they preferably fall within a range of more than 0° and not more than 10°, and particularly more than 0° and not more than 6°. The two oblique lines 13a' and 13b' intersect with each other at a position dividing the thickness of the optical functional sheet layer 11 into $T_1$ and $T_2$ (the left and right directions of FIG. 3). $T_1$ and $T_2$ are preferably the same thickness.

In this variation, the wedge portion 13' has two oblique lines. However, the wedge portion 13' is not limited thereto but may have three or more oblique lines to thereby have a polygonal line shaped cross section or may have curved oblique lines.

Figure 4:
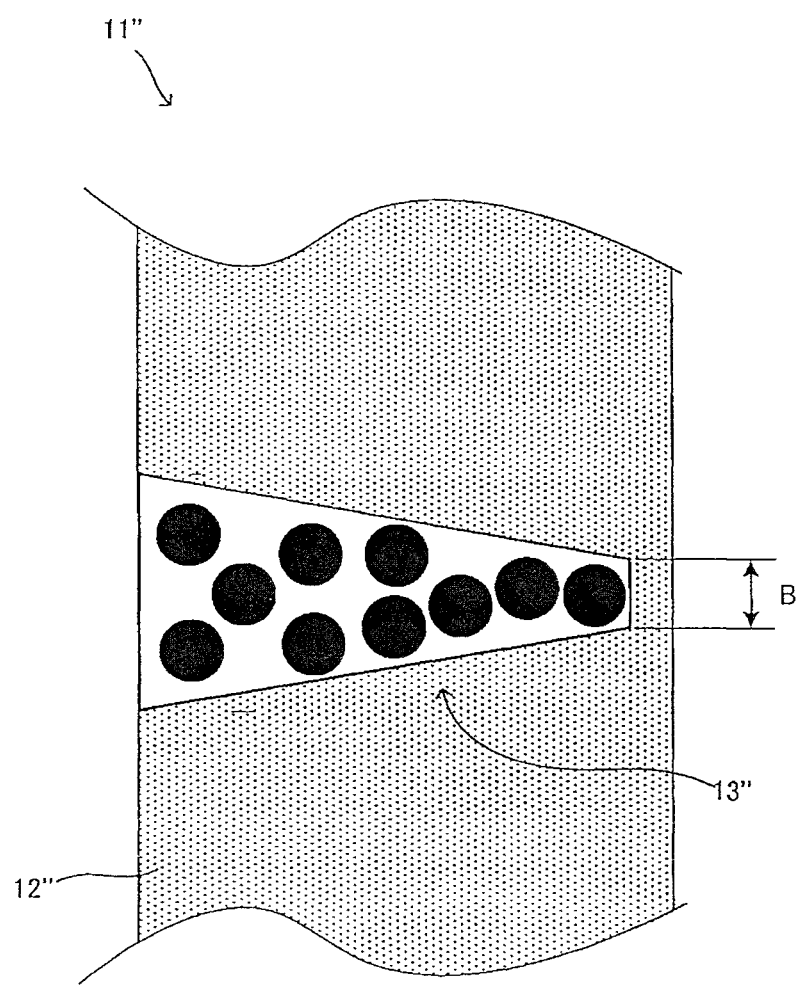
FIG. 4 is a partially enlarged view of the optical sheet of the invention when a wedge portion has a trapezoidal shape.

In the present embodiment, there has been described that the wedge portions each have a triangular shape; however, the shape is not limited thereto but may have a trapezoidal shape. FIG. 4 shows a trapezoidal wedge portion 13" of an optical functional sheet layer 11" and prisms 12" adjacent thereto. In this example, the wedge portion 13" has a trapezoidal shape shown in FIG. 4. In that case, the longer base (the lower base) of the trapezoid can be provided on the side remote from a PET film layer (not shown) (the left side of FIG. 4), and the shorter base can be provided on the PET film layer side (the right side of FIG. 4). The length B of the upper base of FIG. 4 preferably falls in a range of 2 to 25 μm.

Returning to FIG. 1, other constitution of the optical sheet 10 will be described. The PET film layer 16 is a film layer as a base for forming the optical functional sheet layer 11 on the PET film layer 16. The PET film layer 16 is composed mainly of PET. As long as the PET film layer 16 is composed mainly of PET, it may contain other resins. The main component of the PET film layer 16 is a component contained in an amount of not less than 50 wt.% based on the weight of the entire PET film layer 16. The PET film layer 16 may further contain a suitable amount of various additives. Conventional additives include an antioxidant of phenol type or the like and a stabilizer of lactone type or the like.

The light-absorbing layer 17 is a layer reducing the amount of light. The light-absorbing layer is not specifically limited as long as it has a property capable of reducing the amount of light. In the reduction of the amount of light, the amount of light may be reduced regardless of a wavelength of the light, or the amount of light with a wavelength within a predetermined range may be reduced. When the amount of light with a predetermined wavelength is reduced, the so-called color tone can be corrected; thereby the reduction in the light amount and the color tone correction can be simultaneously attained. Hence convenience can be enhanced.

When the amount of light is reduced regardless of a wavelength of light, for instance, ND filter (Neutral Density Filter) layer can be used. When the amount of light with a wavelength within a predetermined range is reduced, a Tint layer or the like can be used.

The amount of light reduced in the light-absorbing layer 17 can be suitably selected by the brightness of applicable PDP and a display device. As an example, the thickness and light-absorbing performance of the light-absorbing layer 17 can be adjusted to make the transmittance of the light-absorbing layer 17 be approximately 60%.

The adhesive layer 18, as described later, is, for example, a layer disposed with an adhesive for bonding the optical sheet 10 to other sheets or members disposed in a plasma television 1. An adhesive used in the adhesive layer 18 transmits light therethrough; thus, as long as the adhesive can suitably bond the optical sheet 10 to other components, the material is not particularly limited. For example, acrylic-type copolymer can be used, and the viscosity is, for example, approximately several N/25 mm to 20N/25 mm.

The optical sheet 10 having the above constitution can block widespread external light, thereby the optical sheet attaining the improvement of a contrast can be provided. The reason will be described later.

Figure 5:
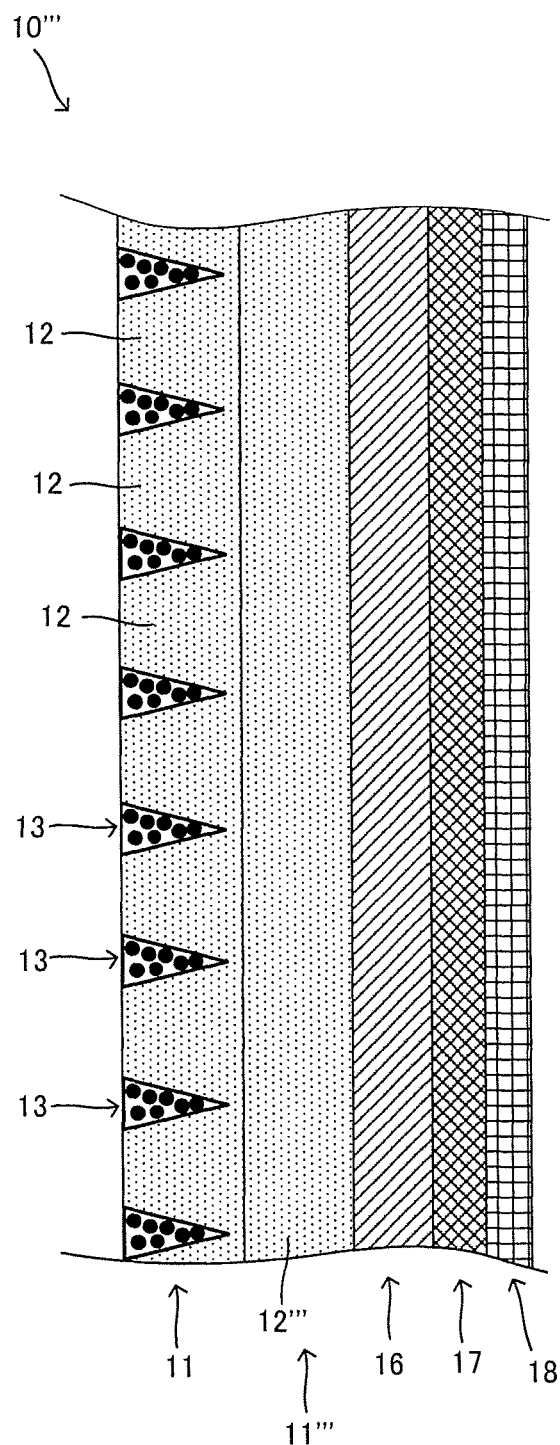
FIG. 5 is a view showing a layer structure of the optical sheet of the invention when two optical functional sheet layers are stacked.

FIG. 5 is a cross-sectional view of an optical sheet 10''' of another variation of the present invention and shows a schematic layer structure of the optical sheet 10'''. The optical sheet 10''' of this variation includes the other optical functional sheet layer 11''' held between the optical functional sheet layer 11 and the PET film layer 16 of the optical sheet 10 of the first embodiment. In this case, a prism 12''' and a wedge portion (not shown) are disposed perpendicular to the prisms 12 and the wedge portions 13 of the optical functional sheet layer 11. Thus, the prism 12''' of the optical functional sheet layer 11''' and the wedge portion are alternately arranged in parallel on the far/near side of FIG. 5.

Figure 6:
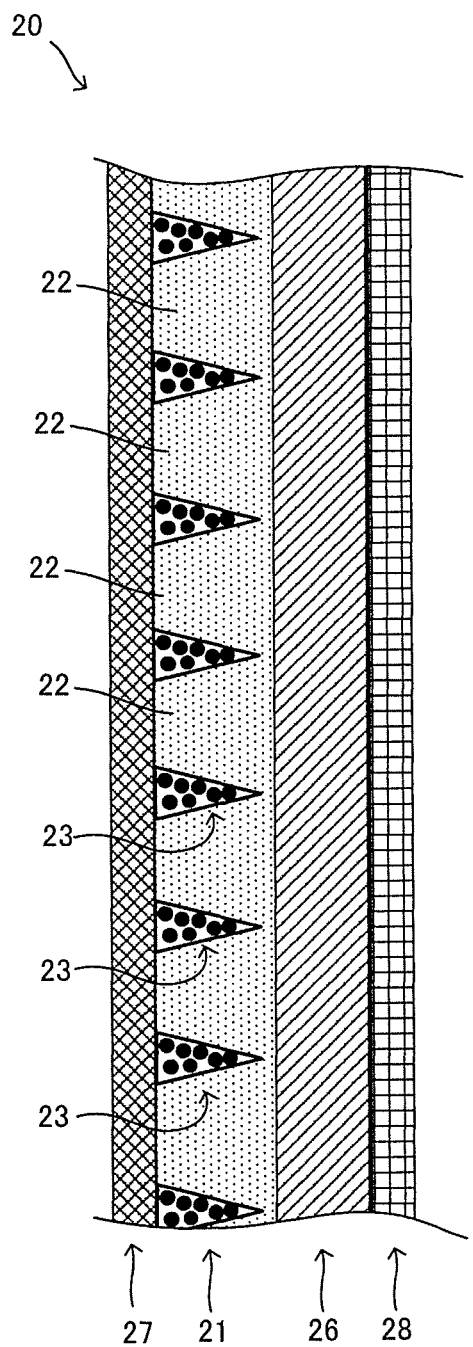
FIG. 6 is a cross-sectional view of an optical sheet according to a second embodiment of the invention and shows a schematic layer structure of the optical sheet.

FIG. 6 is a cross-sectional view of an optical sheet 20 of the present invention according to a second embodiment and shows a schematic layer structure of the optical sheet 20. The optical sheet 20 comprises: an optical functional sheet layer 21, a PET film layer 26 as a base material layer, a light-absorbing layer 27, and an adhesive layer 28. These layers extend on the far/near side of the drawing while maintaining the cross section shown in FIG. 6.

The optical sheet 20 of the second embodiment is characterized in that the light-absorbing layer 27 is provided on one side of the optical functional sheet layer 21, which is the opposite side of the optical functional sheet layer 21 from the PET film layer 26. Even when the light-absorbing layer 27 is disposed in this manner, the optical sheet 20 is applicable to the optical sheet of the present invention. Since the layers of the optical sheet 20 are in common with those in the optical sheet 10, their descriptions will be omitted here.

The optical sheets 10 and 20 are, for example, produced as follows. A liquid body which is a material of prisms is applied to each one side of the PET film layers 16 and 26. Then, while holding the material of the prisms between a PET film and a roll die for forming the shape of the prism, ultraviolet is irradiated to cure the material to form the prisms 12 and 22. Then, to the gap between the prisms 12, 12 and 22, 22, a liquid body having a transparent resin as a material of a binder containing black light absorbing particles is filled. Extra material is then removed by, for example, scraping. Ultraviolet is then irradiated to cure the liquid body, to form the wedge portions 13 and 23. Consequently, the optical functional sheet layers 11 and 21 are produced. The light-absorbing layers 17 and 27 as well as the adhesive layers 18 and 28 are respectively stacked on the optical functional sheet layers 11 and 21.

The method for stacking the light-absorbing layers 17 and 27 is not particularly limited. For example, a layer which has been previously formed into a film form and becomes a light-absorbing layer is stacked, whereby the light-absorbing layer may be formed. Alternatively, a light curing material to become a light-absorbing layer is coated onto a sheet in the form of a liquid body, ultraviolet is irradiated to the material to cure the material, whereby the light-absorbing layer may be formed. According to this constitution, the light-absorbing layer can be directly coated.

Figure 7:
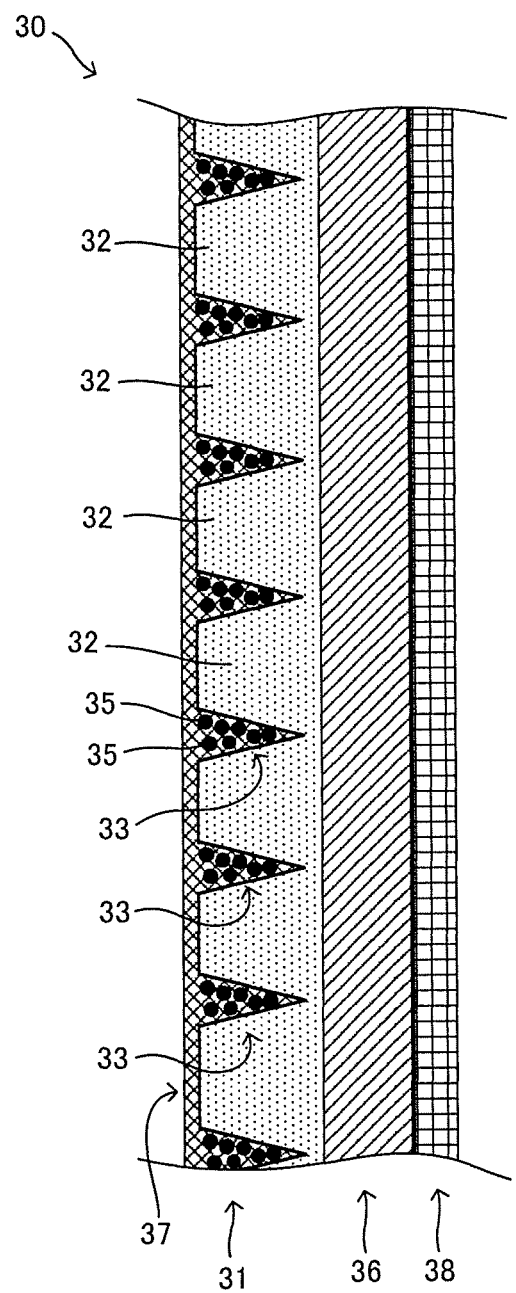
FIG. 7 is a cross-sectional view of an optical sheet according to a third embodiment of the invention and shows a schematic layer structure of the optical sheet.
Figure 8:
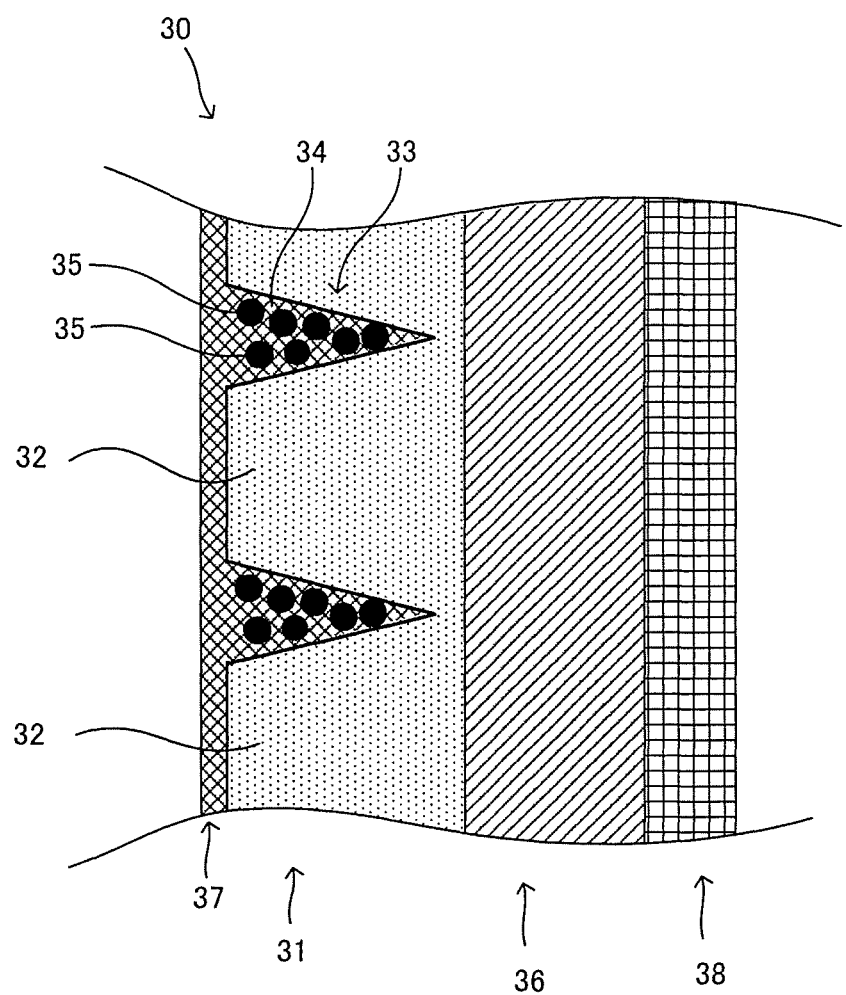
FIG. 8 is a partially enlarged view of the optical sheet of FIG. 7.

FIG. 7 is a cross-sectional view of an optical sheet 30 according to the third embodiment of the present invention and shows a schematic layer structure of the optical sheet 30. FIG. 8 is a partially enlarged view of FIG. 7. The optical sheet 30 comprises: an optical functional sheet layer 31, a PET film layer 36 as a base material layer, a light-absorbing layer 37, and an adhesive layer 38. These layers extend on the far/near side of the drawing while maintaining the cross section shown in FIG. 7.

As seen in FIGS. 7 and 8, the optical sheet 30 of the third embodiment further comprises the light-absorbing layer 37 on one side of the optical functional sheet layer 31, which is the opposite side of the optical functional sheet layer 31 from the PET film layer 36. Binders 34 of wedge portions 33 are formed of the same material as the material of the light-absorbing layer 37 to have a light-absorbing action. The light-absorbing layer 37 and the wedge portions 33 are integrally formed with each other. Even when the light-absorbing layer 37 is disposed in this manner, the optical sheet 30 is applicable to the optical sheet of the present invention. Since the layers of the optical sheet 30 are in common with those in the optical sheet 10, their descriptions will be omitted here. According to this constitution, the binders 34 can have an effect of reducing the amount of light and/or an effect of color tone correction.

The thickness of the light-absorbing layer 37 is not specifically limited as long as necessary performance can be obtained. However, in view of manufacturing, it is preferable that the light-absorbing layer 37 has a thickness not more than the diameter of the light-absorbing particles contained in the wedge portions 33. A material of a binder of the light-absorbing layer 37 and the wedge portions 33 is not specifically limited; for example, urethane acrylate containing black pigment can be used. Examples of the black pigment include carbon black, ivory black, aniline black, vine black, peach black, and lamp black.

The optical sheet 30 is, for example, produced as follows. A liquid body which is a material of the prisms is applied to one side of the PET film layer 36. Then, while holding the material of the prisms between a PET film and a roll die for forming the shape of the prism, ultraviolet is irradiated to cure the material to form the prisms 32. Then, a binder material dispersed with black light-absorbing particles and having a light-absorbing action is filled in between the prisms 32; and thereafter, the binder material is coated onto the surface of the upper base side of each of the prisms 32. Extra material is then removed from the surface on the upper base side of each of the prisms 32 by scraping such that the dispersed light-absorbing particles do not remain and the binder material forms a layer with a predetermined thickness by adjusting a gap. Then, ultraviolet is irradiated to cure the resin to form the wedge portions 33 and the light-absorbing layer 37. According to this constitution, the wedge portions and the light-absorbing layer can be simultaneously formed.

In this embodiment, the wedge portions 33 and the light-absorbing layer 37 are simultaneously cured; however, the same materials are not necessarily cured simultaneously, and the wedge portions and the light-absorbing layer may be cured separately.

Figure 9:
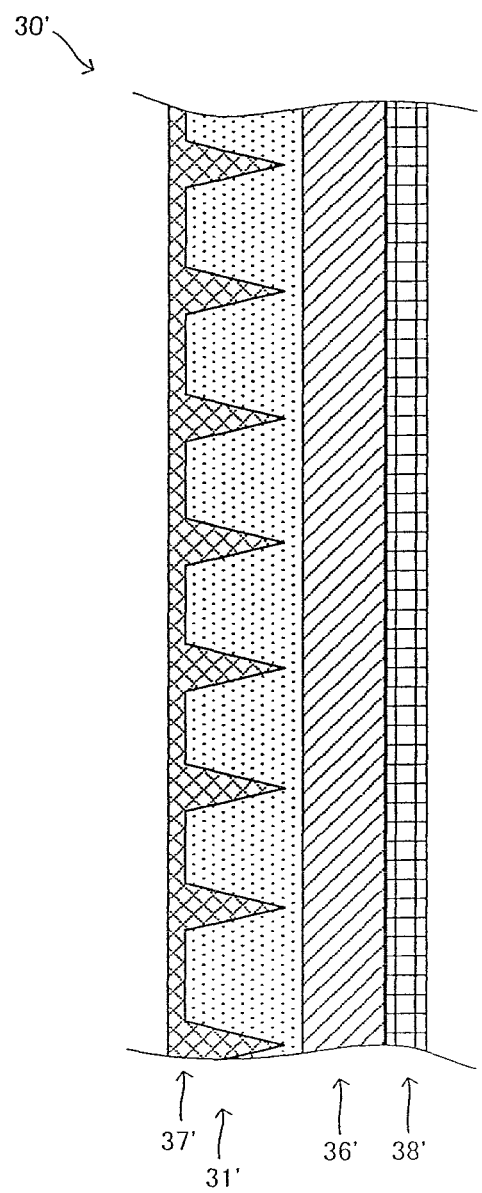
FIG. 9 is a cross-sectional view of an optical sheet which is a variation of the optical sheet of FIG. 7 and shows a schematic layer structure of the optical sheet.

FIG. 9 is a cross-sectional view of an optical sheet 30' which is a variation of the optical sheet 30 and shows a schematic layer structure of the optical sheet 30'. The optical sheet 30' comprises: an optical functional sheet layer 31', a PET film layer 36' as a base material layer, a light-absorbing layer 37', and an adhesive layer 38'. These layers extend on the far/near side of the drawing while maintaining the cross section shown in FIG. 9.

The optical sheet 30' does not include the light-absorbing particles 35 of the optical sheet 30 (see FIG. 8.) but does include a binder resin having a light-absorbing action. The optical sheet 30' can also be applied to the optical sheet of the present invention. Since the layers of the optical sheet 30' other than the light-absorbing particles are in common with those in the optical sheet 30, their descriptions will be omitted here.

Each base material layer of the optical sheets 10, 20, 30, and 30' of the present invention is not necessarily formed of PET, and "a polyester-based resin" such as polybutylene terephthalate resin (PBT) and polytrimethylene terephthalate resin (PTT) may be used. In the present embodiments, in view of performance, mass productivity, price, availability, and so on, a resin composed mainly containing PET is preferably used as the material of the base material layer.

The optical sheet of the present invention may further comprise functional film layers such as a film layer blocking electromagnetic waves, a film layer correcting a color tone, a film layer cutting a neon line, a film layer cutting infrared rays, a film layer preventing reflection, a film layer preventing static charge, and a film layer for anti glare.

Figure 10:
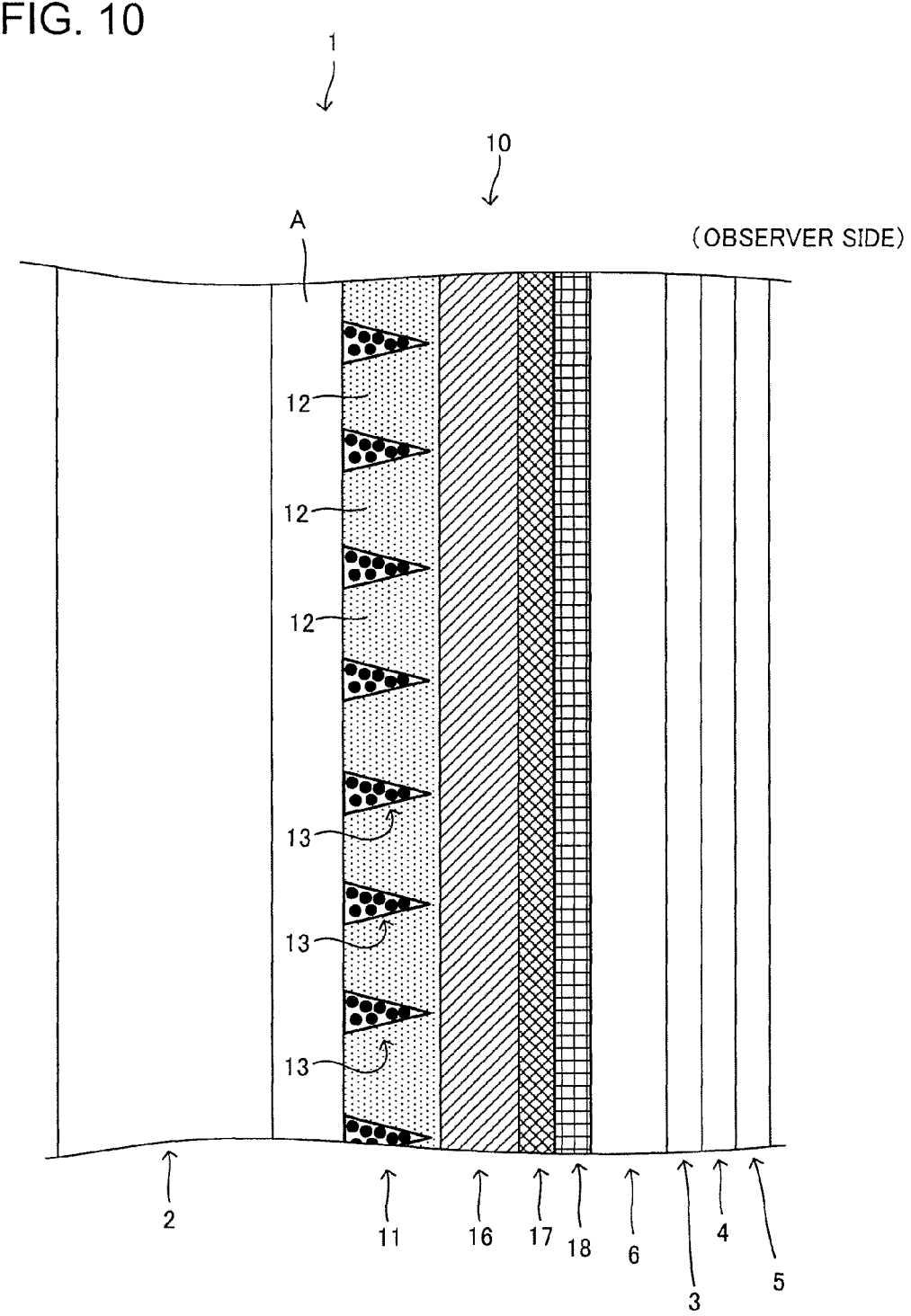
FIG. 10 is a view focusing on a part of a plasma television where PDP and the optical sheet of the present invention are provided, when the optical sheet is attached to the plasma television.

Next, the constitution of the optical sheet 10 of the present invention attached to the plasma television 1 which is a display device will be described. FIG. 10 is a cross-sectional view focusing on a part of the plasma television 1 where the PDP 2 and the optical sheet 10 are disposed when disposing the optical sheet 10 on the light emission side of the PDP 2 and assembling the PDP 2 and the optical sheet 10 in the plasma television 1. The right side of FIG. 10 is an observer side. In this example, the optical sheet 10 is used, but the same holds for the optical sheets 20 and 30.

As shown in FIG. 10, the optical sheet 10 of the present invention is disposed on the observer side at an interval "A" with respect to the PDP 2 as an image source. The observer side of the adhesive layer 18 has a glass plate 6 and various layers (3, 4, and 5) having functions of AR, AS, and AG. "AR" stands for "antireflection" and is a function of suppressing a light reflectance. "AS" stands for "antistatic" and is a static charge prevention function. "AG" stands for "anti-glare" and is a function capable of preventing glare of the surface of a prism.

In the above example, the optical sheet further comprises various layer of AR, AS, and AG. However, as required, the optical sheet can furthermore comprise layers having other functions: such as a layer blocking electromagnetic waves, a layer blocking infrared rays and a neon line, and a toning layer.

Although the interval "A" is provided between the PDP 2 and the optical sheet 10; it is not necessarily provided, and the optical sheet 10 may be stacked directly on the surface of the PDP 2. In this case, the surface of the optical sheet 10 facing the PDP 2 includes an adhesive layer.

Figure 11:
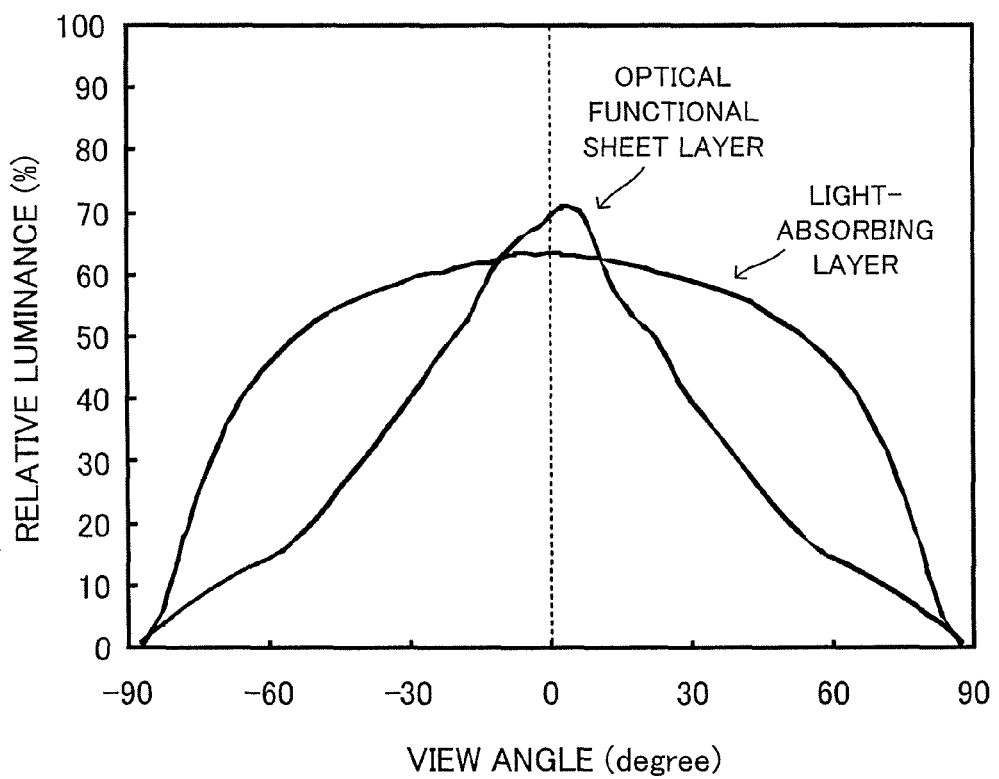
FIG. 11 is a view showing a relation between a view angle and a relative luminance.

Next, how external light is blocked by the optical sheet of the present invention will be described. FIG. 11 is a graph of the so-called "view angle property" showing each property of a light-absorbing layer and an optical functional sheet layer when the horizontal axis represents a view angle (degree) and the vertical axis represents a relative luminance (%). The view angle means an angle formed by the normal line of a screen from the center of the screen and a line of sight toward the center of the screen. With regard to the view angle, the upper side of FIG. 10 is positive, and the lower side of FIG. 10 is negative. The relative luminance means the ratio (percentage) of the luminance in the case where the optical sheet is disposed to the luminance of 100% in the case where the optical sheet is not disposed.

The view angle properties are obtained by measuring the luminance at each view angle. In the measurement, a three-dimensional goniophotometer GP-500 (manufactured by Murakami Color Research Laboratory Co., Ltd.) is used.

As seen in FIG. 11, when the view angle is ±15 degrees, the optical functional sheet layer has a relative luminance higher than the relative luminance of the light-absorbing layer. Thus, this means the optical functional sheet layer is less likely to absorb external light in a range of the relevant view angle. Meanwhile, the relative luminance of the light-absorbing layer is approximately constant in a wide range. However, therefore the relative luminance is high at a large view angle (the angle with a large absolute value), and external light is poorly absorbed.

Figure 12:
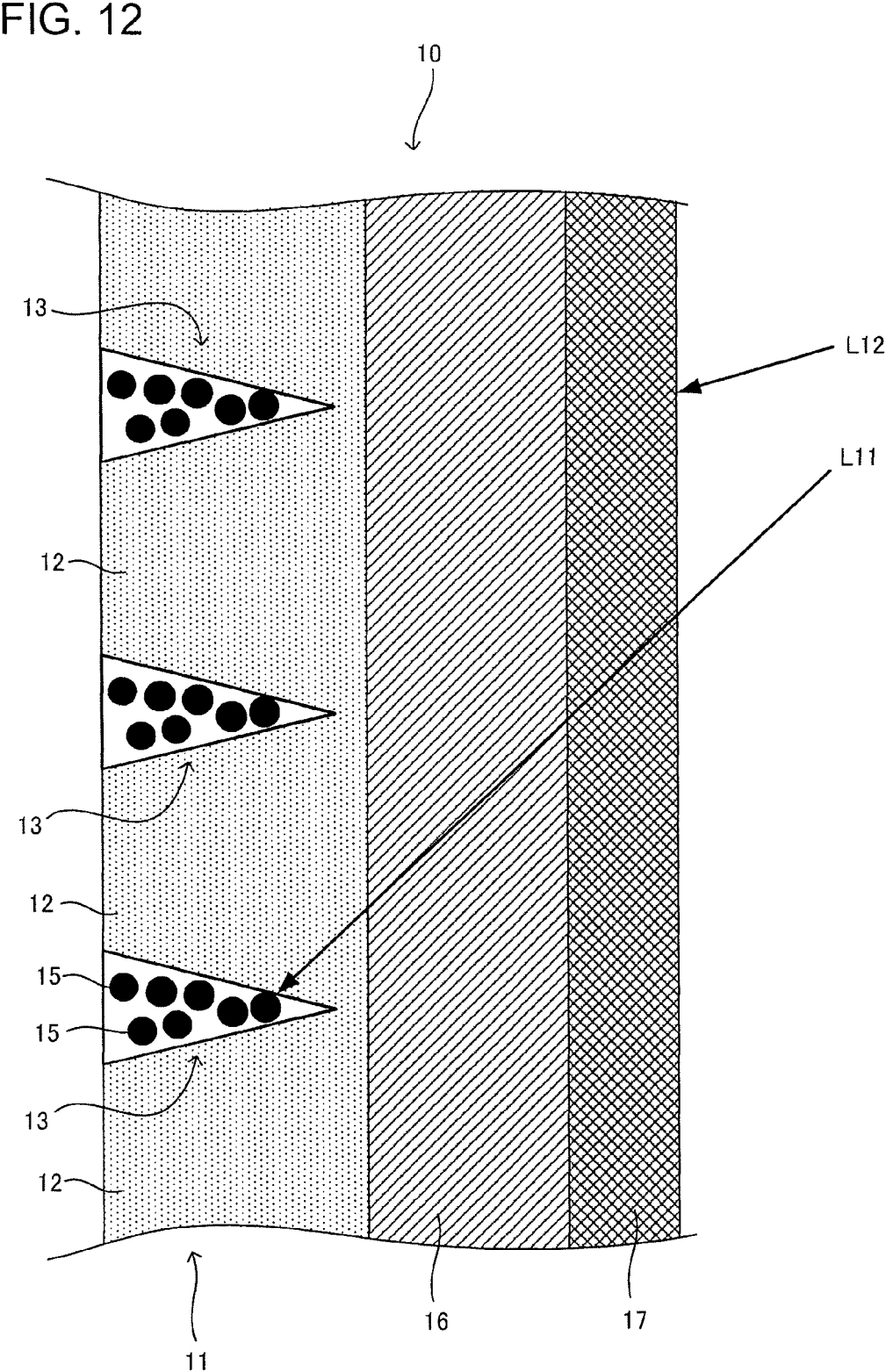
FIG. 12 is a view for explaining external light absorption in the optical sheet of FIG. 1.
Figure 13:
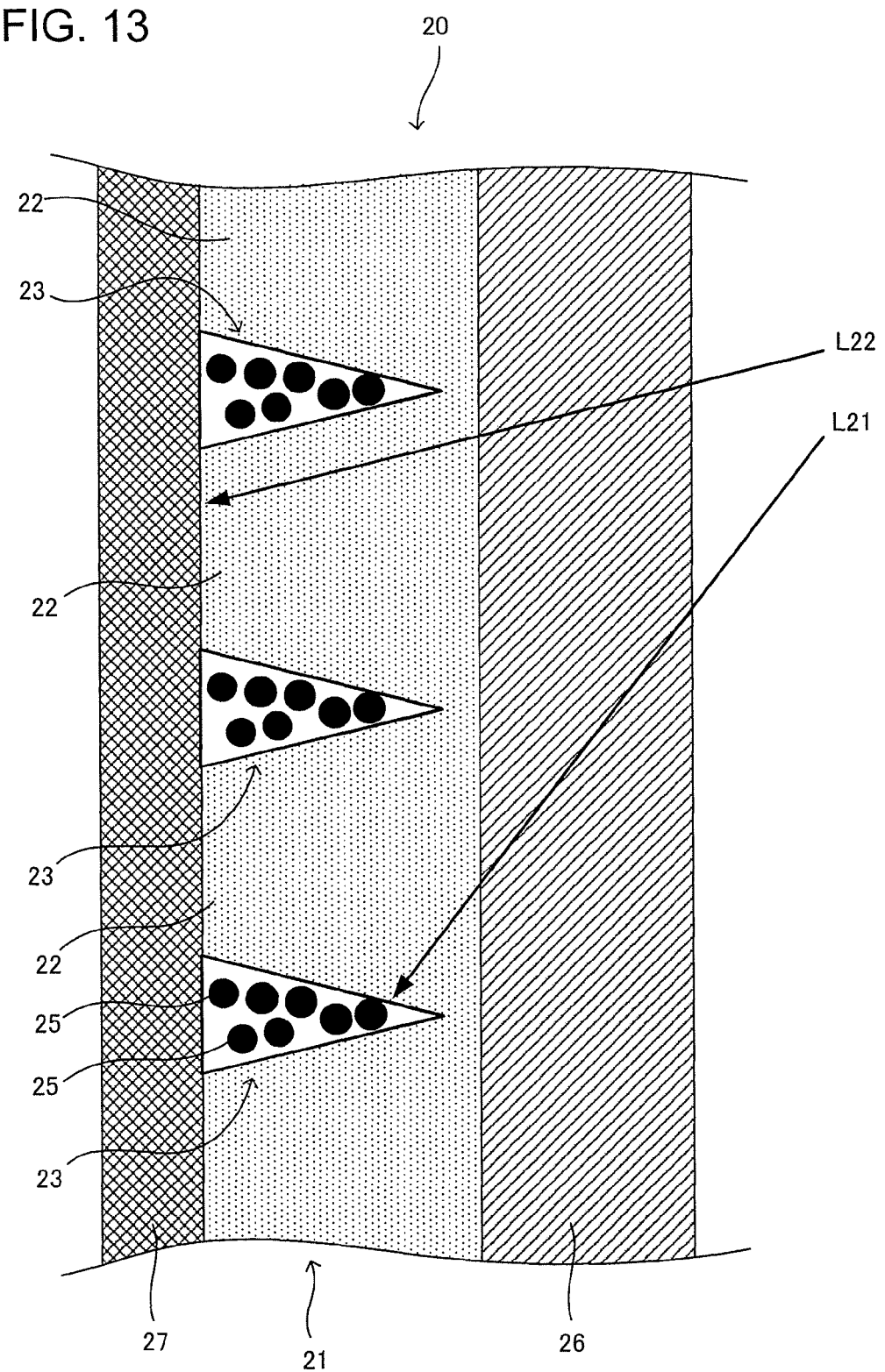
FIG. 13 is a view for explaining external light absorption in the optical sheet of FIG. 6.

According to the optical sheet 10 of the present invention, as schematically shown in FIG. 12, external light L11 entering at a large angle (the angle with a large absolute value) is absorbed mainly by the wedge portion 13. Meanwhile, external light L12 entering at a small angle (the angle with a small absolute value) is absorbed mainly by the light-absorbing layer 17. FIG. 13 shows a similar example using the optical sheet 20. In FIG. 13, external light L21 entering at a large angle (the angle with a large absolute value) is absorbed mainly by the wedge portion 23. Meanwhile, external light L22 entering at a small angle (the angle with a small absolute value) transmits through the prism 22 but is absorbed by the light-absorbing layer 27.

Figure 14:
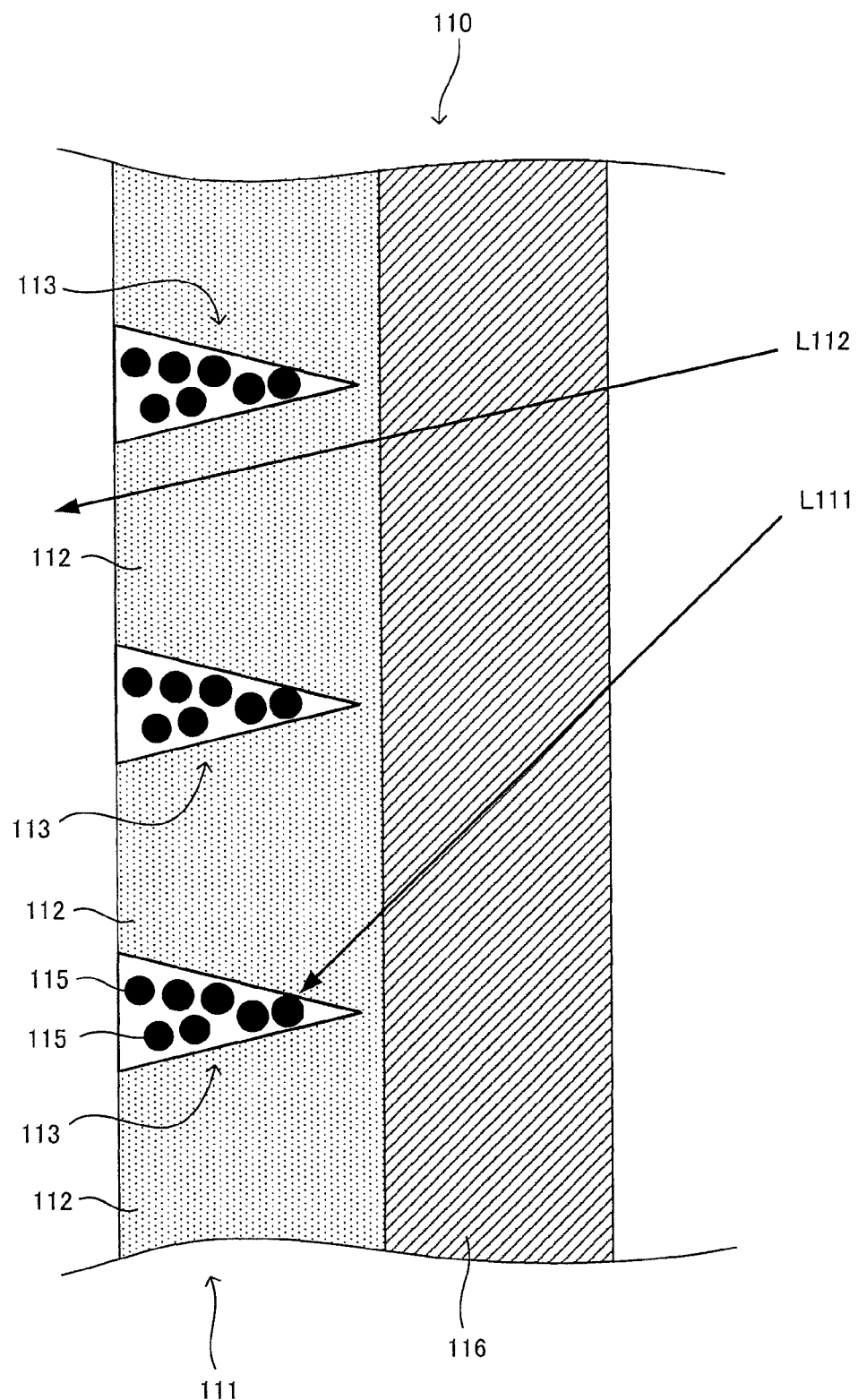
FIG. 14 is a view for explaining external light absorption in a conventional example.

Meanwhile, according to the conventional optical sheet 110, as shown in FIG. 14, external light L111 entering at a large angle (the angle with a large absolute value) is absorbed mainly by a light abosorbing particle 115 in a wedge portion 113 of an optical functional sheet layer 111; however, external light L112 entering at a small angle (the angle with a small absolute value) is not absorbed but transmits through a prism 112 of the optical sheet 110. Thus, the transmitted light reaches the PDP or is reflected by other surfaces or boundaries, whereby the light influences image light to lead to reduction in contrast.

As described above, according to the optical sheet of the present invention, external light entering from a wide range can be suitably absorbed. Thus, a good contrast optical sheet can be provided.

Examples of the optical sheet having the above constitution will be described in more detail as follows. However, the present invention is not limited to the range of the examples.

EXAMPLES

In this example, with regard to an optical sheet including a wavelength-dependent light-absorbing layer (example) and an optical sheet without including a light-absorbing layer (comparative example), the influences on a contrast given when decreasing the external light incident angle are tested. Hereinafter, the conditions and results are shown.
<Test Samples>

As a test example, an optical sheet in which only the presence of a light-absorbing layer and the stacked position are changed is produced. The specifics are shown in Table 1.

TABLE 1

| No. | Pitch of wedge portions (mm) | Occupied area ratio of wedge portion (%) | Slope angle of wedge portion (degree) | Thickness of optical functional sheet layer (mm) | Light-absorbing layer | Notes |
|---|---|---|---|---|---|---|
| 1 | 70 | 30 | 4.5 | 100 | Presence (observer side) | Example |
| 2 | 70 | 30 | 4.5 | 100 | Presence (image source side) | Example |
| 3 | 70 | 30 | 4.5 | 100 | Absence | Comparative example |

The optical sheet No. 1 includes a light-absorbing layer on the observer side (corresponding to the optical sheet 10), and the optical sheet No. 2 includes a light-absorbing layer on the image source side (corresponding to the optical sheet 20). The optical sheet No. 3 does not include a light-absorbing layer.

<Contrast Measurement>

The contrast was measured as follows. External light was irradiated from above to the center of a screen of a PDP at a predetermined angle such that the illuminance level was 150 lx. The contrast was the ratio of the brightness when the screen was displayed in white by the PDP to the brightness when it was displayed in black. The predetermined angle was 30°.

In the evaluation, a value of a contrast at the predetermined angle (30°) and a value of a contrast at the external light incident angle of 45° (a reference contrast) in the case where a light-absorbing layer is not provided in an optical sheet (the same as the optical sheet No. 3) are compared with each other. The result is shown in Table 2.

TABLE 2

| | Contrast | | |
|---|---|---|---|
| No. | External light incident angle 30° | Percentage of reference contrast (%) | Notes |
| 1 | 56.5 | 103.5 | Example |
| 2 | 55.6 | 101.8 | Example |
| 3 | 42.3 | 77.5 | Comparative example |

The contrast at the external light incident angle of 45°, as a reference contrast, in the case where the light-absorbing layer is not provided is 54.6. Meanwhile, with regard to the contrast of each optical sheet at the small external light incident angle of 30°, the contrast of the optical sheet No. 3 of the comparative example was lowered. Meanwhile, the optical sheets 1 and 2 of the present invention, regardless of small external light incident angle, could obtain the contrast substantially the same as the contrast at the external light incident angle of 45° of the optical sheet No. 3. Namely, the optical sheet including the light-absorbing layer can obtain a good contrast even at a small angle, whereby a good contrast can be obtained even with respect to a wide range of external light incident angles.

The above has described the present invention associated with the most practical and preferred embodiments thereof. However, the invention is not limited to the embodiments disclosed in the specification. Thus, the invention can be appropriately varied as long as the variation is not contrary to the subject substance and conception of the invention which can be read out from the claims and the whole contents of the specification. It should be understood that an optical sheet, a display device, and a method for producing the optical sheet, with such an alternation are included in the technical scope of the invention.

The invention claimed is:

1. An optical sheet disposed on an observer side relative to an image light source comprising:
    a plurality of layers that control light emitted from the image light source to emit the light on the observer side,
    wherein at least one of the plurality of layers is an optical functional sheet layer, which comprises prisms being arranged in parallel along a surface of the optical sheet whereby light is transmitted and wedge portions being arranged in parallel between the prisms whereby a part of visible light is absorbed;
    at least one of the plurality of layers other than the optical functional sheet layer is a light-absorbing layer capable of absorbing light all over the light-absorbing layer, and is capable of absorbing the part of visible light;
    and the light-absorbing layer and the wedge portions of the optical functional sheet layer absorb a same wavelength of light.

2. The optical sheet according to claim 1, wherein the light-absorbing layer absorbs light having a predetermined wavelength.

3. The optical sheet according to claim 1, wherein the wedge portion and the light-absorbing layer comprise same materials.

4. A display device comprising the optical sheet according to claim 1.

* * * * *